March 12, 1935.  J. W. CARTHEW  1,994,190
CHECKING GAUGE
Filed March 11, 1932
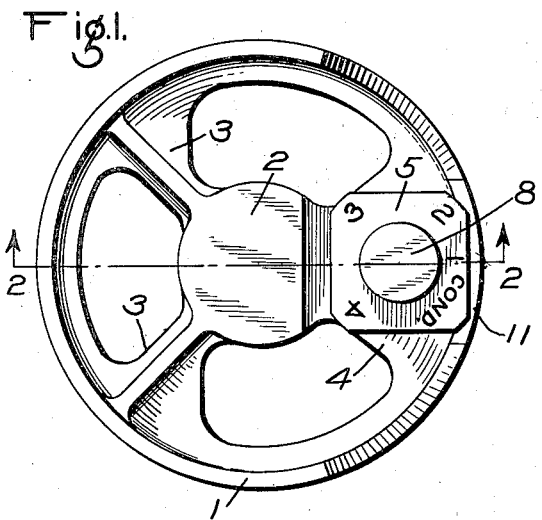
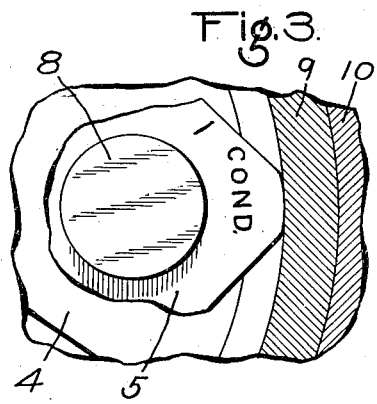
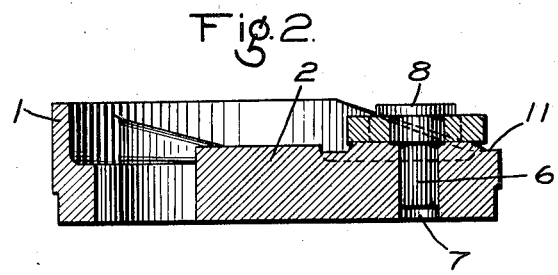
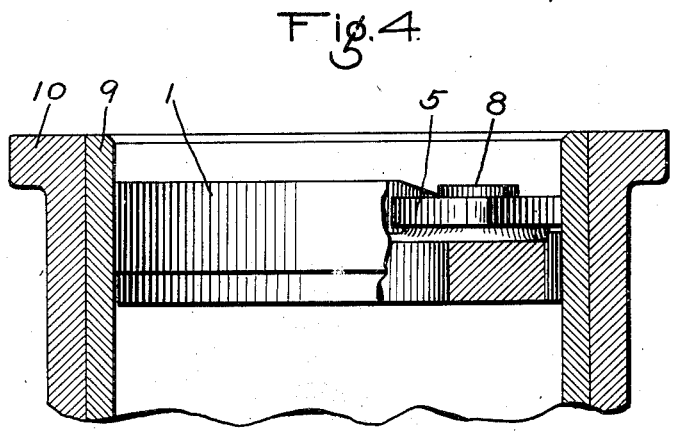
INVENTOR.
JOHN W. CARTHEW
By *Wm. M. Cady*
ATTORNEY.

Patented Mar. 12, 1935

1,994,190

UNITED STATES PATENT OFFICE 1,994,190

CHECKING GAUGE

John W. Carthew, Wilmerding, Pa., assignor to The Westinghouse Air Brake Company, Wilmerding, Pa., a corporation of Pennsylvania Application March 11, 1932, Serial No. 598,126

1 Claim. (Cl. 33—178)

This invention relates to a gauge device adapted more particularly for checking the internal diameter of a cylinder.

One object of my invention is to provide a gauge device for checking the internal diameter of a cylinder which is simple to operate, of few parts, and which may be cheaply manufactured.

In the case of a cylinder, in which a piston fitted with piston rings operates, when the cylinder bore becomes worn, it is often the practice to remove the piston rings and replace same with piston rings of slightly greater diameter to correspond more nearly with the enlarged diameter of the cylinder bore due to wear.

It is usual to provide oversize piston rings of different diameters, so that when the cylinder bore is worn to a certain extent, one oversize piston ring will be used, and when the cylinder bore is worn to a greater extent, an oversize piston ring of greater diameter is used.

In order to select the particular diameter of oversize piston ring required, it is necessary to determine the diameter of the worn cylinder bore.

Another object of my invention is to provide a gauge device for testing the diameter of a cylinder bore, by the use of which, the particular diameter of oversize piston ring required to suit the cylinder bore can readily be determined.

In the accompanying drawing; Fig. 1 is a plan view of a checking gauge embodying my invention; Fig. 2 a section on the line 2—2 of Fig. 1; Fig. 3 a plan view of an enlarged fragment of the gauge shown in Fig. 1, showing the indicator element in its condemned position with relation to a cylinder bushing; and Fig. 4 a fragmentary sectional view of a cylinder and bushing, showing the checking gauge inserted in the cylinder bore of the bushing.

As shown in the drawing, the gauge may comprise a ring 1 having a hub 2 and ribbed webs 3 integrally connecting the hub with the ring. The hub is also connected to the ring by a web 4 provided to carry an indicator plate 5. The plate 5 is secured to a pin 6 which extends into a bore 7 of the web 4, and said pin is provided with a head 8.

The plate 5 is preferably square, with the corners rounded off on a radius somewhat less than the radius of the external cylindrical face of the ring 1 and may be marked 1, 2, 3, 4, and cond. as shown.

To use the gauge, it is inserted in the cylinder bore to be gauged, in the manner shown in Fig. 4, which shows the gauge inserted in the cylinder bore of a bushing 9 of a cylinder 10, the indicator plate 5 being in the No. 1 position when inserted in the bore.

The plate 5 is now rotated in a clock-wise direction from the No. 1 position. If the cylinder bore is in new or unworn condition, the No. 2 corner is such that it will not pass the cylinder wall. If the cylinder bore is worn a certain amount, the plate 5 may be rotated, so that the No. 2 corner will pass the cylinder wall. If the plate can be rotated to pass the No. 2 position, but not the No. 3 position, then the diameter of the cylinder bore is such as to require the use of the first over-size piston ring.

If the plate can be rotated past the No. 3 position and not past the No. 4 position, then the next larger size piston ring is required. If the plate 5 can be rotated past the No. 4 position but not past the condemned position, the next larger size piston ring is required. If the plate can be rotated past the position marked "cond.", then the cylinder bore is considered as worn beyond repair and is condemned.

The gauge may also be employed to check the diameter of the cylinder bore at various points by moving the gauge back and forth in the cylinder bore, and the point of greatest wear may be thus determined and thereby the amount of reboring necessary to true the cylinder bore.

The outside diameter of the ring 1 of the gauge is accurately ground to correspond with the diameter of the usual plug gauge for a new cylinder and the ring is of sufficient depth to ensure against cocking of the ring. The ring 1 is cut away, as shown at 11 to permit the plate 5 to be rotated into engagement with the cylinder wall.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

A gauge for checking the diameter of a cylinder bore comprising a cylindrical ring portion engageable in the cylinder bore and having substantially the diameter of said bore to prevent cocking of the ring, and a rotatable plate carried by said gauge having a portion, the rotation of which past the cylinder wall depends upon the diameter of the cylinder bore.

JOHN W. CARTHEW.